US011613009B2

(12) United States Patent
Savini et al.

(10) Patent No.: US 11,613,009 B2
(45) Date of Patent: Mar. 28, 2023

(54) CONNECTION ANALYZED MAKE-UP SYSTEMS AND METHODS

(71) Applicant: Frank's International, LLC, Houston, TX (US)

(72) Inventors: Marcus Savini, Church Point, LA (US); Brennan Domec, Sunset, LA (US); Vernon Bouligny, New Iberia, LA (US)

(73) Assignee: FRANK'S INTERNATIONAL, LLC, Houston, TX (US)

( * ) Notice: Subject to any disclaimer, the term of this patent is extended or adjusted under 35 U.S.C. 154(b) by 839 days.

(21) Appl. No.: 16/527,840

(22) Filed: Jul. 31, 2019

(65) Prior Publication Data

US 2020/0047336 A1 Feb. 13, 2020

Related U.S. Application Data

(60) Provisional application No. 62/715,588, filed on Aug. 7, 2018.

(51) Int. Cl.
*G01L 5/00* (2006.01)
*B25J 9/16* (2006.01)
*G01N 19/08* (2006.01)
*E21B 19/16* (2006.01)
*E21B 44/00* (2006.01)

(52) U.S. Cl.
CPC .............. *B25J 9/163* (2013.01); *E21B 19/165* (2013.01); *E21B 44/00* (2013.01); *G01L 5/00* (2013.01); *G01N 19/08* (2013.01)

(58) Field of Classification Search
CPC ........ B25J 9/163; E21B 19/165; E21B 44/00; G01L 5/00; G01N 19/08
See application file for complete search history.

(56) References Cited

U.S. PATENT DOCUMENTS

| 3,368,396 | A | 2/1968 | Van Burkleo et al. |
| 3,606,664 | A | 9/1971 | Weiner |
| 4,127,927 | A | 12/1978 | Hauk et al. |
| 4,962,579 | A | 10/1990 | Moyer et al. |
| RE34,063 | E | 9/1992 | Vincent et al. |
| 5,245,465 | A | 9/1993 | Tomita et al. |

(Continued)

OTHER PUBLICATIONS

Extended European Search Report dated Dec. 16, 2019, EP Application No. 19190358, pp. 1-7.

*Primary Examiner* — Max H Noori
(74) *Attorney, Agent, or Firm* — MH2 Technology Law Group LLP

(57) ABSTRACT

A method including acquiring measurements representing torque applied to a connection between a first tubular and a second tubular, a rotational position of the first tubular relative to the second tubular, or both, obtaining a plurality of make-up parameters representing conditions under which the connection is fully made, generating a plurality of rules for connection evaluation based on the make-up parameters, and automatically evaluating the connection using a computer. Automatically evaluating includes applying machine learning, the plurality of rules, or a combination thereof to a dataset of the measurements. The method also includes recommending accepting or rejecting the connection based on the automatic evaluation.

21 Claims, 8 Drawing Sheets

(56) References Cited

U.S. PATENT DOCUMENTS

| | | |
|---|---|---|
| 6,896,055 B2 | 5/2005 | Koithan |
| 7,264,050 B2 | 9/2007 | Koithan et al. |
| 7,296,623 B2 | 11/2007 | Koithan et al. |
| 7,594,540 B2 | 9/2009 | Koithan et al. |
| 8,689,866 B2 | 4/2014 | Patterson et al. |
| 8,726,743 B2 | 5/2014 | Ruehmann et al. |
| 2007/0118494 A1 | 5/2007 | Jannarone et al. |
| 2012/0123757 A1 | 5/2012 | Ertas et al. |
| 2014/0116687 A1 | 5/2014 | Reumann |
| 2014/0222729 A1 | 8/2014 | Dasgupta et al. |
| 2014/0326505 A1 | 11/2014 | Davis et al. |
| 2014/0372347 A1 | 12/2014 | Cohen et al. |
| 2018/0296281 A1* | 10/2018 | Yeung .................... A61B 34/32 |
| 2019/0048709 A1* | 2/2019 | Teague ..................... G01V 5/12 |
| 2019/0085681 A1* | 3/2019 | Teague ................. E21B 47/002 |
| 2020/0318474 A1* | 10/2020 | Sonnier ................. G06N 20/00 |
| 2021/0088396 A1* | 3/2021 | Sches ................... F16L 15/004 |

* cited by examiner

CONNECTION ANALYZED MAKE-UP SYSTEMS AND METHODS

CROSS-REFERENCE TO RELATED APPLICATIONS

This application claims benefit of U.S. Provisional Patent Application having Ser. No. 62/715,588, which was filed on Aug. 7, 2018 and is incorporated herein by reference in its entirety.

BACKGROUND

In the oil and gas industry, various different types of strings of tubulars, made-up together end-to-end, are used at different stages to perform specific functions. One type of tubular string is a completion string, which is used to line a previously drilled wellbore in order to complete the well and produce hydrocarbons therefrom. The tubulars are connected together end-to-end via threaded connections that are machined either directly onto the pipe body or via a threaded coupling. As the tubular string is deployed farther into the wellbore, additional tubulars are added to the tubular string. Drilling rigs thus include one of a variety of systems (e.g., power tongs, top drives, spiders, etc.) some of which support the deployed section of the string and others that provide rotational makeup capability to rotate an add on tubular (or stand of tubulars) to the upper-most connection of the deployed string. The add-on tubular is then rotated until a secure connection is made, resulting in the add-on tubular becoming part of the string. The now-longer string is then advanced into the wellbore, and the process may be repeated.

It is critical to tubular string deployment that the tubulars are connected together ("made-up") properly in order for the string to provide the mechanical performance required. Improperly made up connections can be prone to leakage, as the tubular strings typically rely on metal-to-metal seals formed between the connections. Moreover, tubular manufacturers may warranty tubular performance, but only if the threaded connections are made up within certain specifications. Such improperly made-up connections, if not detected prior to deployment, may necessitate removing affected portions of the tubular string from the well in order to remake the connections and/or replace damaged tubulars, which can significantly impact the economic viability of the well.

Two types of sensors are generally used to monitor parameters that are indicative of the makeup process. The first sensor is a position sensor, which may measure the position of one tubular relative to another (typically in terms of rotation). The second sensor captures the torque applied to the add-on tubular during the makeup process. These measurements may be monitored and analyzed during the connection makeup process. The data is stored, and a real-time display of the measurements in the form of a two-dimensional torque vs turns or torque vs time graph is analyzed. At the conclusion of the connection makeup process, operators may review the graphs of the measurements as a function of turns or time, and determine if the connection is acceptable, or if an unacceptable condition mode is evident, indicating that the connection should be backed out and remade.

Conventional systems may rely on torque only, position only, or may combine torque and position ("torque-turn"). Moreover, connections may be verified based on "delta torque" or "delta turn", which refers to the torque or turns applied after shoulders at the end of the threaded region of the tubulars are engaged. The measured values of the delta torque or delta turns for the specific connection type being made up may be compared against various prescribed ranges of values.

While such systems have greatly increased the ability of rig operators to ensure proper connection makeup, these systems still rely on human interpretation of the sensor measurements taken and displayed and/or calculations based thereon. Accordingly, the accuracy of the interpretation may be subject to variation based on the skill, experience, and attentiveness of the operator. Furthermore, the operator evaluating the connection process is generally not able to fully interpret the graph in real-time, and thus is typically reviewing an already made-up connection. At that point, however, if the connection is bad, the connection has to be disconnected (or broken-out), and if possible, remade. Additionally, human interpreters are generally unable to consider multiple factors related to connection integrity at the same time. Moreover, remaking the connection, after a bad makeup, may not be possible, as the connection process may have damaged the connection threads.

SUMMARY

Embodiments of the disclosure may provide a method including acquiring measurements representing torque applied to a connection between a first tubular and a second tubular, a rotational position of the first tubular relative to the second tubular, or both, obtaining a plurality of make-up parameters representing conditions under which the connection is fully made, generating a plurality of rules for connection evaluation based on the make-up parameters, and automatically evaluating the connection using a computer. Automatically evaluating includes applying machine learning, the plurality of rules, or a combination thereof to a dataset of the measurements. The method also includes recommending accepting or rejecting the connection based on the automatic evaluation.

Embodiments of the disclosure may also provide a system including a tubular rotating component configured to make a connection between a first tubular and a second tubular by rotating the first tubular. The tubular rotating component includes one or more sensors configured to measure torque applied to the first and/or second tubular, a rotational position of the first tubular relative to the second tubular, or both. The system also includes a controller in communication with the one or more sensors, and one or more non-transitory, computer-readable media storing instructions thereon that, when executed by a processor of the controller, cause the controller to perform operations. The operations include acquiring, from the one or more sensors, measurements representing torque applied to a connection between the first tubular and the second tubular, a rotational position of the first tubular relative to the second tubular, or both, obtaining a plurality of make-up parameters representing conditions under which the connection is fully made, generating a plurality of rules for connection evaluation based on the make-up parameters, and automatically evaluating the connection using. Automatically evaluating comprises applying machine learning, the plurality of rules, or a combination thereof to a dataset of the measurements. The operations further include recommending accepting or rejecting the connection based on the automatic evaluation.

The foregoing summary is intended merely to introduce a subset of the features more fully described of the following detailed description. Accordingly, this summary should not be considered limiting.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings. In the figures.

Figure 1:
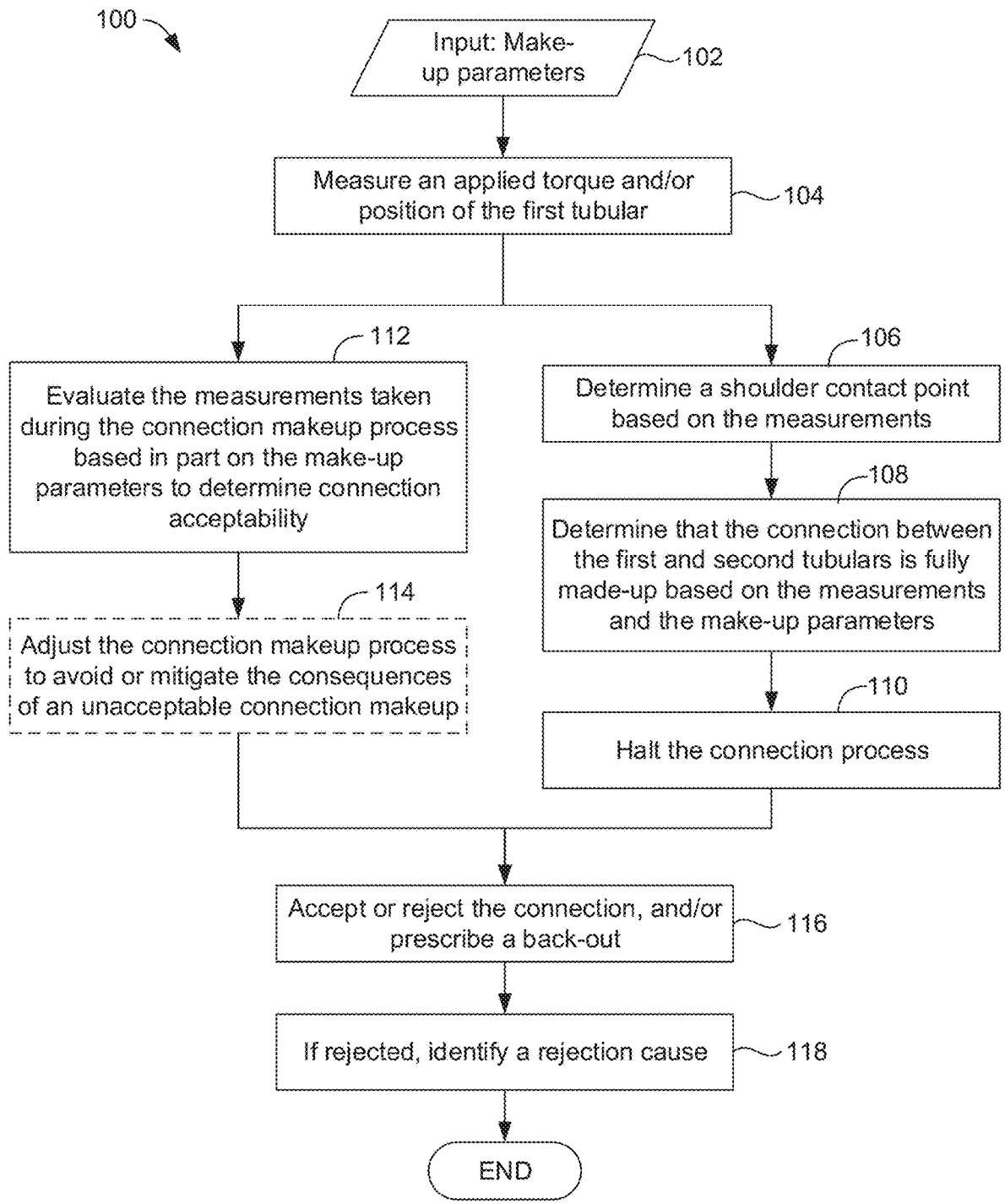
FIG. 1 illustrates a method for monitoring a connection process, according to an embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. The following description is merely a representative example of such teachings.

Figure 2:
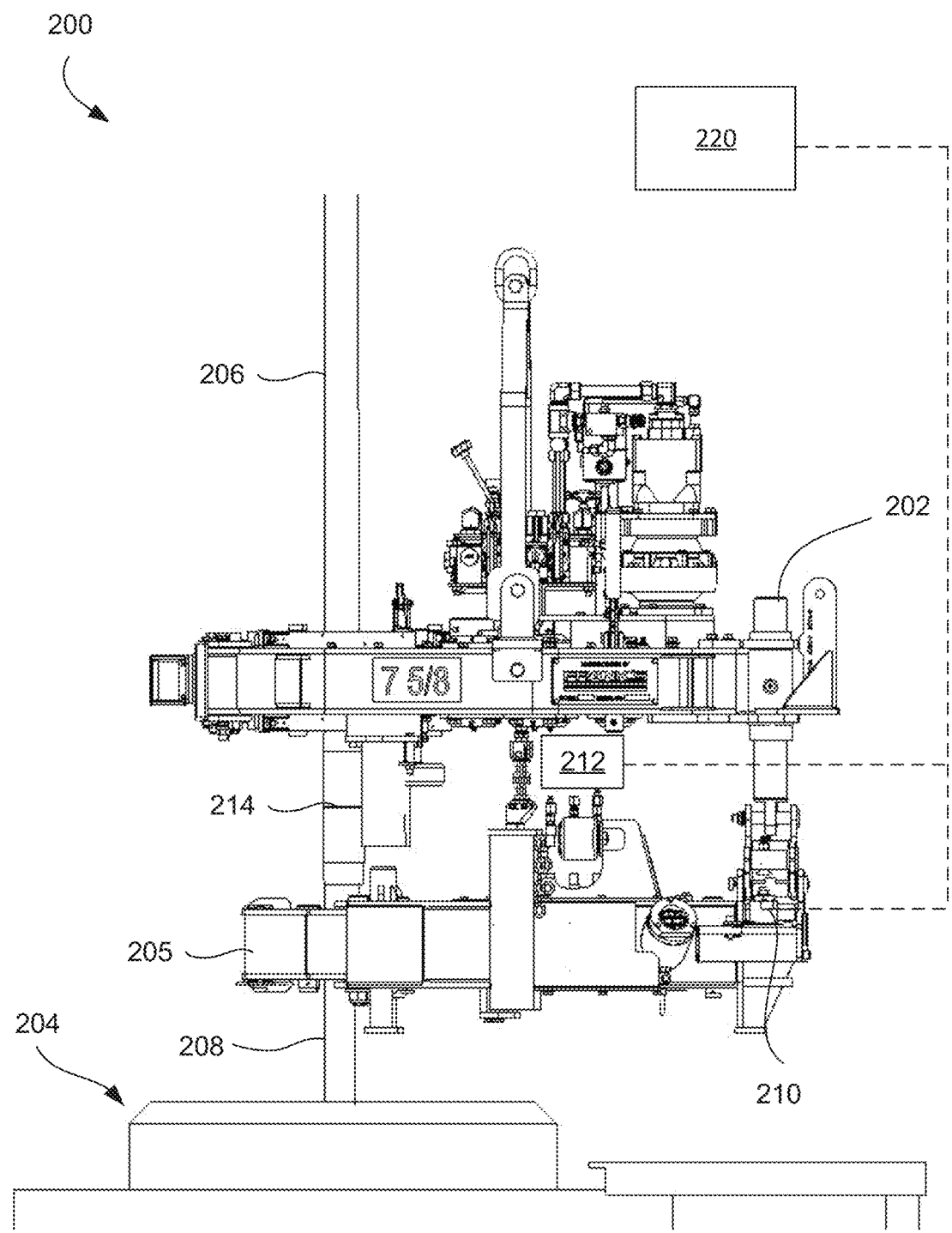
FIG. 2 illustrates a tubular connection system, e.g., a power tong, of a drilling rig connecting an add-on tubular to a string, suspended in the wellbore, according to an embodiment.

FIG. 1 illustrates a flowchart of a method 100 for monitoring a connection between two tubulars, e.g., as part of a completion string or another oilfield tubular string, according to an embodiment. FIG. 2 illustrates a perspective view of a tubular connection system 200 of a drilling rig, according to an embodiment. The system 200 includes tubular rotating equipment (e.g., a tubular rotating component such as a power tong) 202 and tubular support equipment (e.g., a spider) 204. The tubular rotating equipment 202 may also include a backup tong 205 to react torque applied by the power tong 202.

As shown, the power tong 202, backup tong 205, and spider 204 may be employed to connect together a first tubular 206 and a second tubular 208 by rotating the first tubular 206 relative to the second tubular 208 and making up threaded connection 214, which connects the first and second tubulars 206, 208. The system 200 may be employed to carry out the connection makeup process such as that shown in and described below with reference to FIG. 1. The backup tong 205 may include a torque sensor 210, which may be configured to measure the torque applied to the first tubular 206. The tong 202 may also include a rotational position sensor 212, which may be configured to measure a position of the first tubular 206 (e.g., an angular displacement after initial engagement with the second tubular 208) relative to the second tubular 208 during the connection makeup process.

The system 200 may also include a controller 220, which may be configured to communicate with the sensors 210 and 212, either wirelessly or by wire. The controller 220 includes a computer processor with graphical display, signal processing equipment, and communication hardware. The controller 220 may receive and interpret signals from the sensors and convert the signals into meaningful information (e.g., convert voltages or pulses to torque or position). The controller 220 may also be configured to plot the information obtained from the sensors as a function of torque, time, or any other variable. The controller 220 may further be configured to display the plot to a human user, store the plot, etc., and receive input from the human user.

Further, the controller 220 may be configured to make independent determinations about the connection based on the sensor data, as will be described in greater detail below. The controller 220, in some embodiments, may also be able to adjust the operating parameters of the tong 202, e.g., operating speed and/or target torque, in order to avoid improper makeup or damage to the tubular connections. To accomplish this, the controller 220 may employ either or both of a static rules-based analysis and/or a machine-learning analysis that has been trained to link sensor data characteristics, and/or calculations thereof, with proper or improperly made up connections, as will be described in greater detail below. "Machine learning" is defined as the algorithms and statistical models that computer systems may be configured to use in order to perform a specific task effectively without using explicit instructions, relying on patterns and inference instead.

Referring to FIGS. 1 and 2, the method 100 may include receiving inputs, including make-up parameters, as at 102. The make-up parameters may provide settings that enable the controller 220 to identify the conclusion of the make-up process and/or evaluate the acceptability of the connection. The make-up parameters may include any one or more of the following variables, or others: make/break mode, shoulder detect on/off, makeup type—torque vs turns, torque vs time, delta torque vs time, delta torque vs turns, delta turns, position makeup, delta torque, delta turns, maximum torque, optimum torque, minimum torque, maximum shoulder torque, minimum shoulder torque, connection delta turn minimum, connection delta turn maximum, connection delta slope minimum, connection delta slope maximum, and double bumped on/off.

The method 100 may then proceed to monitoring the connection makeup process, e.g., using the sensor data (measurements) mentioned above. In particular, according to an embodiment, the method 100 may include measuring an applied torque (e.g., as applied by tong 202 onto the add-on tubular 206) and/or angular position of the first tubular 206 relative to the second tubular 208, as at 104. These measurements may commence manually, e.g., as when a user indicates that the connection is to be made up, based on position/engagement of tubular handing equipment, and/or when the pipe rotating equipment engages the first tubular 206. At some point, the mating threads of the first and second tubulars 206, 208 may be engaged, e.g., "stabbed", together, such that turning one of the tubulars 206, 208 relative to the other causes threads thereof to mesh together. Measurements may, in some embodiments, be taken beginning at this point, e.g., in response to a human user pressing a button.

Measuring at 104 may include measuring many times during the connection process. For example, the sensors and/or the controller 220 may prescribe a sampling frequency, which may be on the order of one or more times per second (e.g., tens or even hundreds of times per second), or in the case of turns the sampling frequency may vary from 100 data points per turn to over 1000 data points per turn. As the torque and turns are measured, they are displayed on a graphical display. One or more such data points may be considered a "dataset" of measurements.

Figure 8:
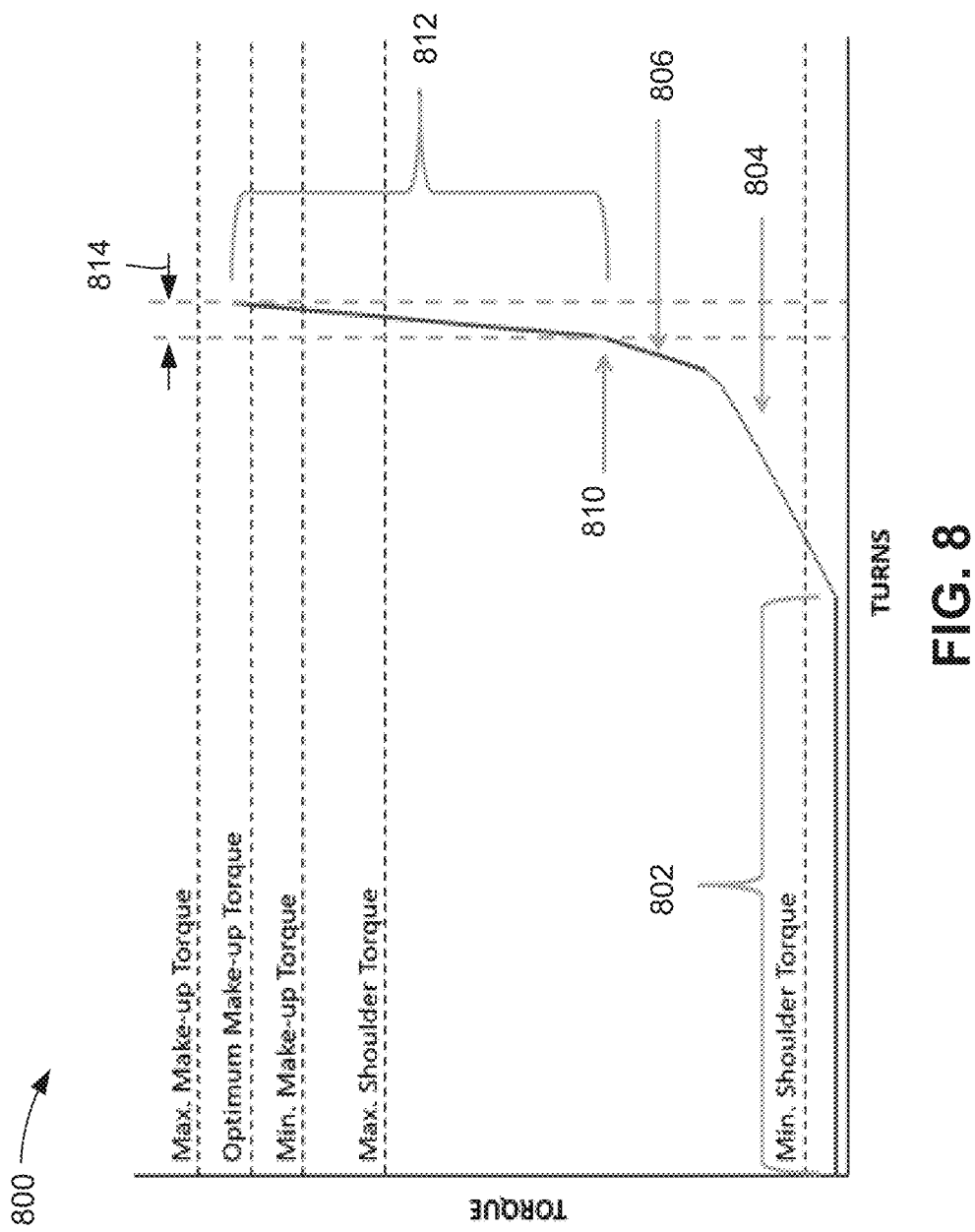
FIG. 8 illustrates a torque-turn graph for a connection, according to an embodiment.

Referring now additionally to FIG. 8, there is shown an example of such a torque-turn graph 800. The application of torque causes the first tubular 206 to rotate relative to the second tubular 208 during "spin in" 802. After spin in, the toque begins to rise, as a taper engagement between the two tubulars 206, 208 causes the connection to take on torque (e.g., through thread interference) at 804. Initial seal engagement may be reached at 806, and at some point, a shouldering point 810 is reached, which may be determined by the controller 220, as at 106. The shouldering point 810 may be identified based on a sharp change in torque over comparably fewer turns than previously, and is generally where the primary metal-to-metal seal or shoulder abutment of the two tubulars 206, 208, at the base of the threaded regions thereof, axially meet together. The torque may continue to be applied after the shoulder-contact point 804, which may serve to further torque up the connection, such that the pin and box connections' features (e.g., metal-to-metal seals and threads) are adequately preloaded.

The make-up parameters may determine when the required torque, beyond the shouldering point 810 has been reached, and a fully made-up connection is made, as at 108. A variety of ways to make this determination are known. For example, a threshold torque or rotation may be specified as a minimum, maximum, and/or optimum torque, as shown in FIG. 8. Additionally or alternatively, a "delta" torque 812, that is, a difference between the measurement of torque at the shoulder contact point and a final position, may be specified. Additionally or alternatively, a "delta" turns (or rotation) 814, that is, a difference between the measurement of turns at the shoulder contact point and a final position, may be specified. The controller 220 may thus determine when the connection is "fully made-up" (although potentially not an acceptable connection) based on the measurements and the predefined make-up parameters. The controller 220 may then halt the connection process, as at 110. In some cases, the controller 220 may halt the connection process or send signals to tong to alter the speed of the makeup process prior to determining that the connection is fully made-up.

The method 100 may, whether during or subsequent to the steps 106, 108, 110, evaluate connection acceptability based on the measurements taken at 104 and the make-up parameters, as at 112. As such, this may be in parallel to the steps 106, 108, 110. The evaluation may be conducted in a variety of ways. In one embodiment, a set of pre-determined, static rules may be used. In another embodiment, the measurements may be fed to a machine learning analysis, trained to detect acceptable and unacceptable connections based on such measurements.

In at least some embodiments, the connection process may be adjusted, as at 114, e.g., on-the-fly, in real-time, in response to the controller 220 evaluating the connection acceptability at 112, prior to the connection being fully made-up. For example, the controller 220 may signal to the tubular rotating equipment 202 to change speeds, or even stop and reverse, in order to avoid a potentially damaging consequence of an unacceptable connection (e.g., to avoid thread damage).

Based on the evaluation at 112, the controller 220 may accept or reject the connection, as at 116. The controller 220 may also prescribe a back-out and remake-up of the connection, if it is determined that the tubulars 206, 208 are unlikely to have been damaged. Further, if the determination at 116 is rejection, the method 100 may include the controller 220 identifying the cause of the rejection, referred to herein as an anomaly, as at 118, and may include prescribing remedial actions (e.g., backing out the connection) and/or steps to take to avoid the same type of rejection in subsequent make-up processes.

Figure 3:
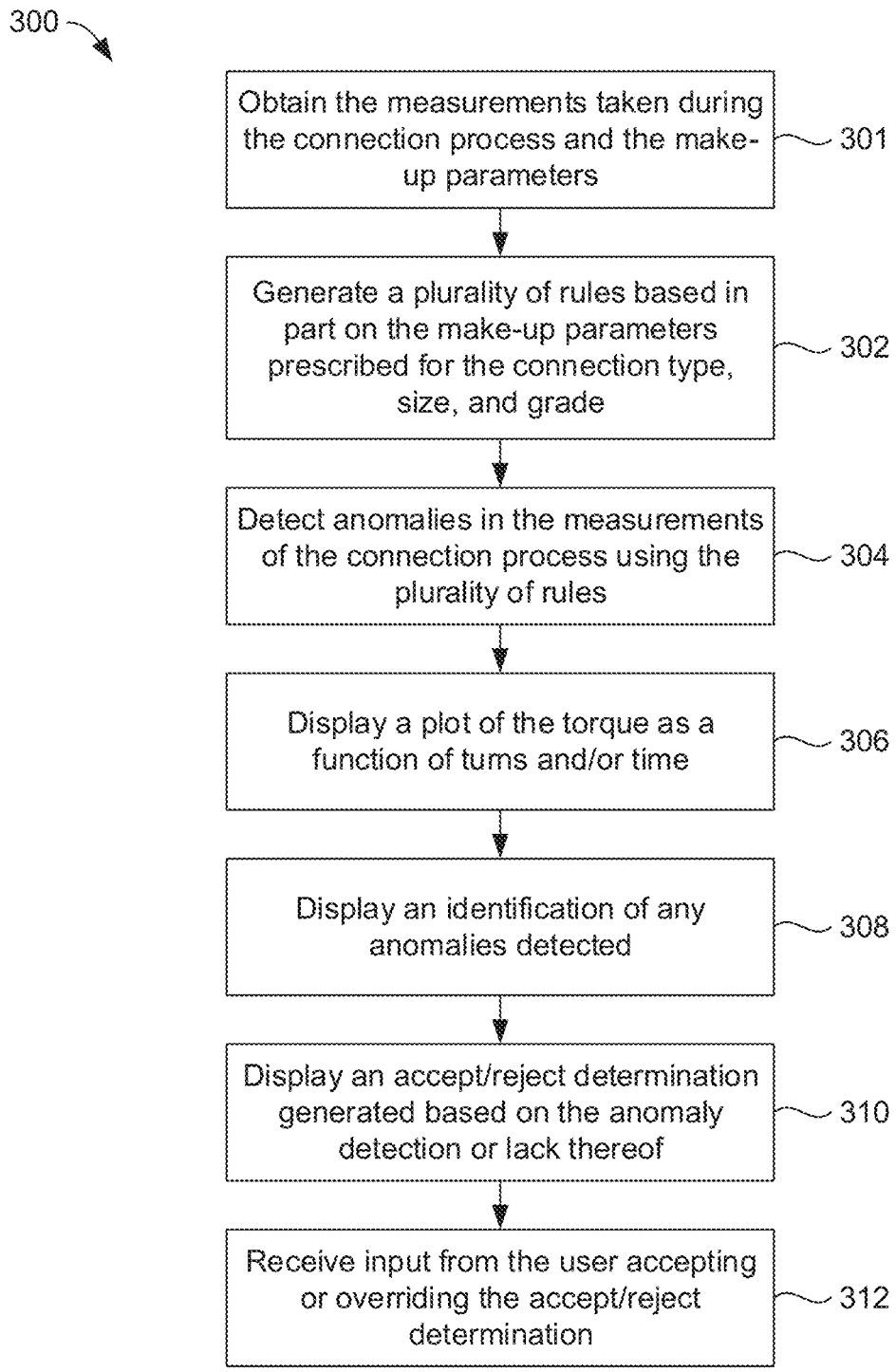
FIG. 3 illustrates a rules-based method for evaluating a connection in the connection makeup process, according to an embodiment.

FIG. 3 illustrates a flowchart of a method 300 for evaluating a connection process, according to an embodiment. In at least one example, the method 300 may provide a first embodiment of the evaluating block 112 shown in FIG. 1. The method 300 may include obtaining the measurements taken during the connection process and the make-up parameters that were inputted, e.g., at 102 (FIG. 1), as at 301.

The method 300 may then include generating a plurality of rules based in part on the make-up parameters, as at 302. In conventional connection analysis, a user reviews a plot of torque versus position (i.e. turns) or torque versus time, and makes an evaluation, potentially with the guidance of certain basic guidelines, e.g., minimum torque, delta torque or delta turns being in range. However, this determination, as mentioned above, introduces the potential for subjectivity, and may not be entirely repeatable or dependable depending on the user's skill, experience, attentiveness, fatigue level, mental state, etc. at that moment. In some cases, human users may be unable to distinguish between different types of anomalies, or may be unable to quickly determine a specific type of anomaly. By contrast, the method 300 provides rules that allow a computer to quickly and reliably make the determination, thereby making the evaluation more consistent and repeatable. The rules may be generated during or prior to the connection process.

At least a partial list of rules that may be generated are discussed below. It will be appreciated that this list of rules includes examples, but it not intended to be exhaustive, i.e., other rules may be developed consistent with the present disclosure. Moreover, some of these rules may not be used in a given embodiment. The non-limiting list of examples of rules is as follows:

1. Overtorque is checked by comparing the peak torque value to the Maximum Torque input. If peak torque is greater than the Maximum Torque input, then the connection is rejected.
2. Undertorque is checked by comparing the peak torque value to the Minimum Torque input. If peak torque is less than the Minimum Torque input, then the connection is rejected.
3. High Shoulder is checked by comparing the shoulder torque value to the Maximum Shoulder Torque input. If the shoulder torque value is greater than the Maximum Shoulder Torque input, then the connection is rejected.
4. Low Shoulder is checked by comparing the shoulder torque value to the Minimum Shoulder Torque input. If the shoulder torque value is less than the Minimum Shoulder Torque input, then the connection is rejected.

5. High Delta Turns is checked by comparing delta turns to the Connection Delta Turn Maximum input. If the delta turns are greater than the Connection Delta Turn Maximum input, then the connection is rejected.
6. Low Delta Turns is checked by comparing delta turns to the Connection Delta Turn Minimum input. If the delta turns are less than the Connection Delta Turn Minimum input, then the connection is rejected
7. High Delta Slope is checked by comparing delta slope to the Connection Delta Slope Maximum input. If delta slope is greater than the Connection Delta Slope Maximum input, then the connection is rejected.
8. Low Delta Slope is checked by comparing delta slope to the Connection Delta Slope Minimum input. If the delta slope is less than the Connection Delta Slope Minimum input, then the connection is rejected.
9. Dope Squeeze is checked by counting consecutive torque points above the shoulder point prior to the Shoulder X value. If the count is greater than the pre-determined threshold, then the connection is rejected.
10. Slippage is checked by calculating a noise factor in the graph after the shoulder point, or in the top half of the graph for non-shouldered connections. If this noise factor is greater than the pre-determined threshold, then the connection is rejected.
11. High Interference is checked by calculating a noise factor in the graph prior to the shoulder point. If this noise factor is greater than the pre-determined threshold, then the connection is rejected.
12. Not Enough Turns is checked by comparing total turns to a pre-determined threshold. If the total turns is greater than the predetermined threshold, then the connection is rejected.
13. No Shoulder is checked by evaluating the Shoulder Point input. If the shoulder detection algorithm did not pick a shoulder point, then the connection is rejected.
14. Cross Threading is determined by a combination of checks. If the connection was under-torqued, not enough turns, and high interference, then the connection is rejected.
15. Damaged Dump Valve is checked by comparing the peak torque value to a percentage above the Maximum Torque Input. If the peak torque value is greater than the Maximum Torque input plus a pre-determined threshold, then the connection is rejected and indication is provided by the system to check for damaged dump valve.

The method 300 may proceed to detecting anomalies in the measurements of the connection makeup process using the plurality of rules, as at 304. This step 304 may occur during the connection makeup process (e.g., in real-time) or thereafter, once the connection has been completed. The anomaly detection may include applying the generated rules to the set of measurements, as a whole, a moving window of data points, a set of data points selected according to a uniform interval, a random set of data points, data points that are evaluated to correspond to specific events (e.g., shoulder contact, seal point), etc.

The plurality of rules generated at 302 may, in some embodiments, all be applied to check for anomalies at 304. This may contrast with conventional, subjective determinations by humans, which may be unable to determine a specific anomaly, or may incorrectly identify the anomaly. Further, human users may omit checking for one or more types of anomalies, whereas the computer-implemented, rules-based embodiment may include the controller 220 reliably checking for anomalies.

The method 300 may then include displaying a plot of the torque versus position or torque versus time, as at 306, and displaying an identification of any anomalies detected, as at 308. In some embodiments, the basis for the anomaly detection may be illustrated in the plot, or may be illustrated in a separate window of a graphical user interface. Furthermore, the method 300 may include displaying an accept/reject determination, which may be generated based on the rules applied in the anomaly detection, as at 310. The method 300 may also include receiving input from a user either accepting the controller 220's recommendation to accept/reject the connection, or overriding the recommendation.

Figure 4:
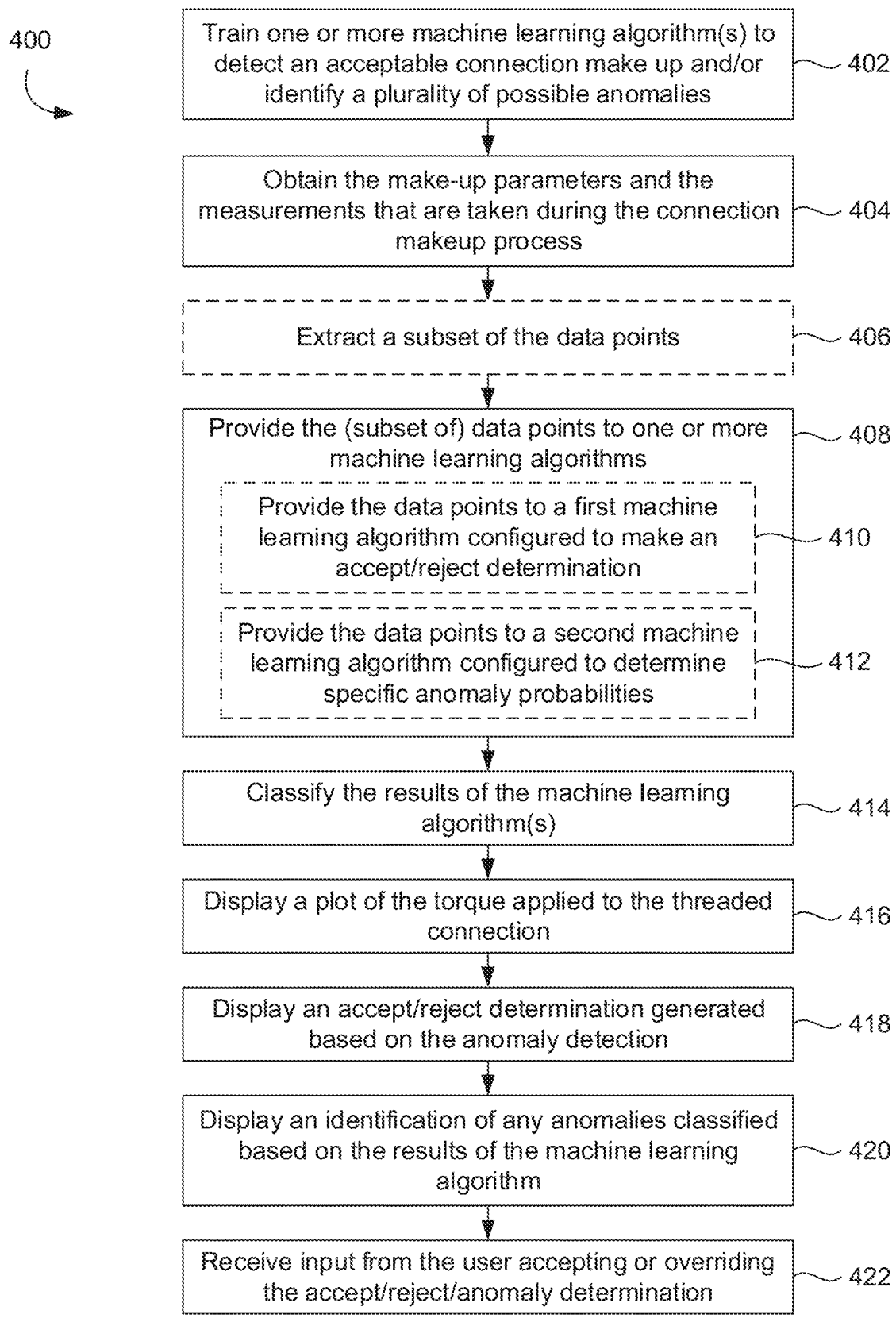
FIG. 4 illustrates a method for evaluating a connection in the connection process that employs machine learning, according to an embodiment.

FIG. 4 illustrates another method 400 for evaluating a connection process, according to an embodiment. The method 400 may provide an embodiment of the evaluation at 112 of FIG. 1. The method 400 may begin by training one or more machine learning algorithms to detect an acceptable connection and/or a plurality of possible anomalies, as at 402. This may occur prior to the connection makeup process, e.g., at a centralized or remote server. The machine learning algorithm may reside on the server, and may be fed a training corpus of measurements taken during a connection process, along with the outcome of the connection process (e.g., accepted, rejected, specific type of anomaly present).

In one example, the machine learning algorithm may be a neural network. Other examples may include random forest classifier, support vector machines, decision trees, etc. Continuing with the example of a neural network, suitable neural network machine learning algorithms include, by way of non-limiting example, feed-forward neural networks, recurrent neural networks, long-short term memory neural networks, and convolutional neural networks. These examples of neural network machine learning algorithms share similar multi-level configurations. By way of example, the neural network architecture in a specific embodiment may be based on inception module with dimension reduction which includes convolutional layers of different sizes followed by max pooling layers, dropout layer, fully connection layer and a softmax layer. The modeling of the neural network may be performed as a directed acyclic graph (DAG) using tensorflow. Graphical processing units (GPU) instances may be used for computational efficiency.

In many cases, the network includes an "input layer" of nodes equal to the size of the input types, one or more "hidden layers" of nodes, and a final "output layer" of nodes equal in size to the input layer. The hidden layers include weight matrices and bias vectors that are updated during the training process by observing the characteristics of the dataset (e.g., the torque/position measurements). The hidden layers, by design, may not have the capacity to store or reproduce exactly what was presented in the input. Instead, they abstract and capture generalized properties of the input dataset. At an extremely high level, it is the responsibility of the hidden layers, per the learning algorithm chosen, to be provided an image and predict a degradation characteristic or consumption. This predictive capability (generally, predicting the conclusion of an expert) is accumulated by observing the experts' characterization of the objects in the images of the training corpus. That is, it constructs a probabilistic model where, given a specific member of the datasets (in the input layer), it can predict whether the connection is acceptable, rejected, and/or what specific type of anomaly has occurred (in the output layer). When processing elements, the internal structure of the network is updating to reinforce and/or forget its predictive pathways.

Deep learning models have a tremendous capacity to learn object properties, provided they are given sufficient, reliable context (that is, consistent datasets to analyze and compare), and a sufficient quantity of training examples (often in the thousands or more) to reliably establish a high degree of confidence in convergence at a conclusion.

In order to train the model, a variety of parameters are fed thereto, in addition to providing the corpus of training datasets. The parameters may include one, some, or all (and/or others) of the following non-exhaustive list:

1. MaxTorque—Maximum Torque allowable for the connection.
2. MinTorque—Minimum Torque allowable for the connection.
3. MaxShoulderTorque—Maximum Shoulder Torque allowable for the connection.
4. MinShoulderTorque—Minimum Shoulder Torque allowable for the connection.
5. TotalTurns—The total turns of the make-up.
6. PeakTorque—The peak torque of the make-up.
7. houlderX—The Shoulder Turn value of the make-up.
8. ShoulderY—The Shoulder Torque value of the make-up.
9. SealX—The Seal Turn value of the make-up.
10. SealY—The Seal Torque value of the make-up.
11. NoiseBeforeSeal—The measure of noise as a percentage of optimum torque before the seal point.
12. NoiseFromSealToShoulder—The measure of noise as a percentage of optimum torque between the seal and shoulder point.
13. NoiseAfterShoulder—The measure of noise as a percentage of optimum torque after the shoulder point.
14. NoiseAfterPeak—The measure of noise as a percentage of optimum torque after the peak torque point.
15. DeltaTurnsMin—The connection's allowable Minimum Delta Turns.
16. DeltaTurnsMax—The connection's allowable Maximum Delta Turns.
17. DeltaTurns—The delta turns value of the make-up. Measure of turns after the shoulder point to total turns.
18. HumpCount—A count of the number of consecutive torque points above the shoulder torque point from the seal to the shoulder point.
19. RPMAtShoulder—The rotational speed of the tool at the shoulder point.
20. OscillationCount—A count of oscillating features between the seal and the shoulder point.
21. OverTorque—A digital value of 1 if peak torque is greater than max torque, 0 otherwise.
22. UnderTorque—A digital value of 1 if peak torque is less than min torque, 0 otherwise.
23. HighDeltaTurns—A digital value of 1 if delta turns is greater than Delta Turns Max, 0 otherwise.
24. LowDeltaTurns—A digital value of 1 if delta turns is less than Delta Turns Min, 0 otherwise.
25. HighDeltaSlope—A digital value of 1 if the delta slope is greater than the Delta Slope Max, 0 otherwise. Delta slope=Delta Torque/(Delta Turns*Optimum Torque)
26. LowDeltaSlope—A digital value of 1 if the delta slope is less than the Delta Slope Min, 0 otherwise.
27. NotEnoughTurns—A digital value of 1 if the turns is not greater than a pre-determined threshold, 0 otherwise.
28. LowShoulder—A digital value of 1 if the shoulder torque value is less than the Min Shoulder Torque value for the connection, 0 otherwise.
29. HighShoulder—A digital value of 1 if the shoulder torque value is greater than the Max Shoulder Torque value for the connection, 0 otherwise.

Once trained, the machine learning algorithms may be deployed onto local (e.g., on or near the drilling rig) machines that are connected to turns sensors 210 and load sensor 212 which is used to determine torque being applied to the connection (FIG. 2). It will be appreciated that the machine learning training may be an iterative process, which may be supervised or unsupervised. That is, the connections between the input layer and the output layer may be strengthened or weakened, either with the assistance of an expert classifier or without, in various implementations. At the discretion of the system operator, the local machines may be updated with new versions of the machine learning algorithms, e.g., after a certain amount of additional training has occurred, or at certain intervals, etc. In other embodiments, the machine learning algorithms may continue learning at the local machines, although this may result in the machine learning algorithms arriving at different conclusions on different machines. In another embodiment, the local machine may merely collect sensor measurements, which may be transmitted to the remote server for analysis by the machine learning algorithms.

With a version of the machine learning algorithms available for use, the method 400 may proceed to obtaining measurements taken during the connection process and the make-up parameters, as at 404. The measurements may be torque and/or position. A plurality of make-up parameters may be obtained, and may include any one or more of the following (and/or others):

1. Make/Break mode
2. Shoulder Detect on/off
3. Makeup Type—Torque vs Turns, Torque vs Time, Delta Torque vs Time, Delta Torque vs Turns, Delta Turns, or Position Makeup
4. Delta Torque input into the setup screen
5. Delta Turns input into the setup screen
6. Maximum Torque
7. Optimum Torque
8. Minimum Torque
9. Maximum Shoulder Torque
10. Minimum Shoulder Torque
11. Connection Delta Turn Minimum
12. Connection Delta Turn Maximum
13. Connection Delta Slope Minimum
14. Connection Delta Slope Maximum
15. Datapoints—Turns, Torque, RPM, and Time
16. Shoulder Point—ShoulderX and ShoulderY
17. Double Bumped on/off
18. Pipe Connection Name
19. Pipe Connection Size In some situations, feeding the entire dataset to the machine learning algorithms may be unnecessary and/or impractical. Accordingly, a dataset that is a subset of the entire dataset may be extracted, as at 406. The extraction of the subset may proceed in a variety of manners. For example, a filter may be employed to detect key points. One example of such a filter is a Kalman filter. In another example, the dataset may be otherwise reduced down, e.g., by selecting points determined to be of relevance (e.g., shoulder point, seal point, peaks in seal area, etc.), or by providing data points recorded during a certain duration, e.g., as part of a moving window. In the last case, the data points from the windows may be provided in sequence to the machine learning algorithms. In some embodiments, however, the extraction of the subset may be unnecessary, and the entire dataset may be fed to the machine learning algorithms.

The method 400 may then include providing the data points to one or more machine learning algorithms, as at 408. In embodiments in which the dataset (subset) of data points is extracted from the entire dataset, the extracted dataset is provided while the remaining data points that were not extracted are not provided to the machine learning algorithm(s). In some embodiments, a single machine learning algorithm may be used. In others, as indicated at 410 and 412, two or more machine learning algorithms may be employed. A first machine learning algorithm may be employed to reliably predict whether the data points indicate an acceptable connection or an unacceptable connection—a binary conclusion. When desired, a second machine learning algorithms may determine, when an unacceptable connection is predicted, what type of anomaly has led to the unacceptable connection. In other embodiments, a single machine learning algorithm may be trained to detect both acceptable/unacceptable and identify the anomaly.

Accordingly, the machine learning algorithm may evaluate the measurements, either in real-time or after the connection has been made, in order to determine a probability value (e.g., a specific value) of one or more anomalies being present. That is, the learning algorithm generally does not output a yes or no for a particular anomaly, but a confidence value, establishing a probability that the anomaly has occurred (or is occurring). The machine learning algorithms may thus be configured to determine, potentially in conjunction with static, predefined rules, any one or more of the following anomalies.

1. Overtorque—Peak Torque above specification limit.
2. Undertorque—Peak Torque below specification limit.
3. High Shoulder—Shoulder Torque above specification limit.
4. Low Shoulder—Shoulder Torque below specification limit.
5. High Delta Turns—Delta Turns above specification limit.
6. Low Delta Turns—Delta Turns above specification limit.
7. High Delta Slope—Delta Slope above specification limit.
8. Low Delta Slope—Delta Slope below specification limit.
9. Dope Squeeze—Thread compound squeezing out feature indicated by a hump prior to shoulder on the graph.
10. Slippage—Slipping of the tong or backup on the pipe indicated by rapid changes in torque.
11. High Interference—Oscillations or noise in thread engagement or after the seal point.
12. Not Enough Turns—Not enough turns recorded.
13. No Shoulder—No shoulder point detected.
14. Cross Threading—Excessive torque build in small amount of turns indicating the pipe as not stabbed properly or the threads are not engaging properly.
15. Damaged Dump Valve—Overtorque of connection with indications the control signal did not try to terminate the process.
16. Spike—Large spike detected in graph with minimal turns. Not true torque.
17. Damaged Load Cell—Dropping of torque signal, typical of torque value spiking to resolution limit of the torque measuring device.
18. Collar Turning—Turning of the coupling at the end of the makeup.
19. Late Shift—High RPM at shoulder or in sealing area and the gear shift process creating noise or spikes in the graph.
20. Unusual Profile—Any shape of the graph not indicative of a normal make-up.
21. Yield—Yielding of the connection indicative of a linear loss of torque at the end of the make-up.

The results from the machine learning algorithms, that is, the confidence levels of accept/reject and/or the confidence levels of any of the particular anomalies, may then be classified, as at 414. Classification may be conducted by comparing the confidence to a threshold value. If the confidence is above the threshold, the conclusion may be that the accept/reject/anomaly identification is accurate. Thus, if the threshold is set, for example, at 0.5, if a confidence level for a particular anomaly is above 0.5, then it is selected as being apparent in the dataset. This threshold can be static and pre-determined, or may change. Further, the same or different thresholds may be employed for different accept/reject/anomaly determinations, e.g., if the machine learning algorithm has a higher propensity for false positives of a particular anomaly, the threshold may be set higher for that anomaly in the classification step at 414.

For example, a random forest classifier may be used to classify the decision. Random forests or random decision forests are a machine learning method for classification, regression and other tasks, which operates by constructing a plurality of decision trees at training time and outputting the class that is the mode of the classes (classification) or mean prediction (regression) of the individual trees.

As with the method 300, the results may then be displayed, beginning at step 416, where a plot of the torque as a function of turns (position) may be shown. Further, the results of the machine learning algorithm's analysis and the classification may be displayed, generally as an accept or a rejection and identification of an anomaly that led to the rejection, as at 418, 420. Further, as with the method 300, the method 400 may be configured to receive input from the user accepting or overriding the accept/reject/anomaly identification, as at 422.

Figure 5:
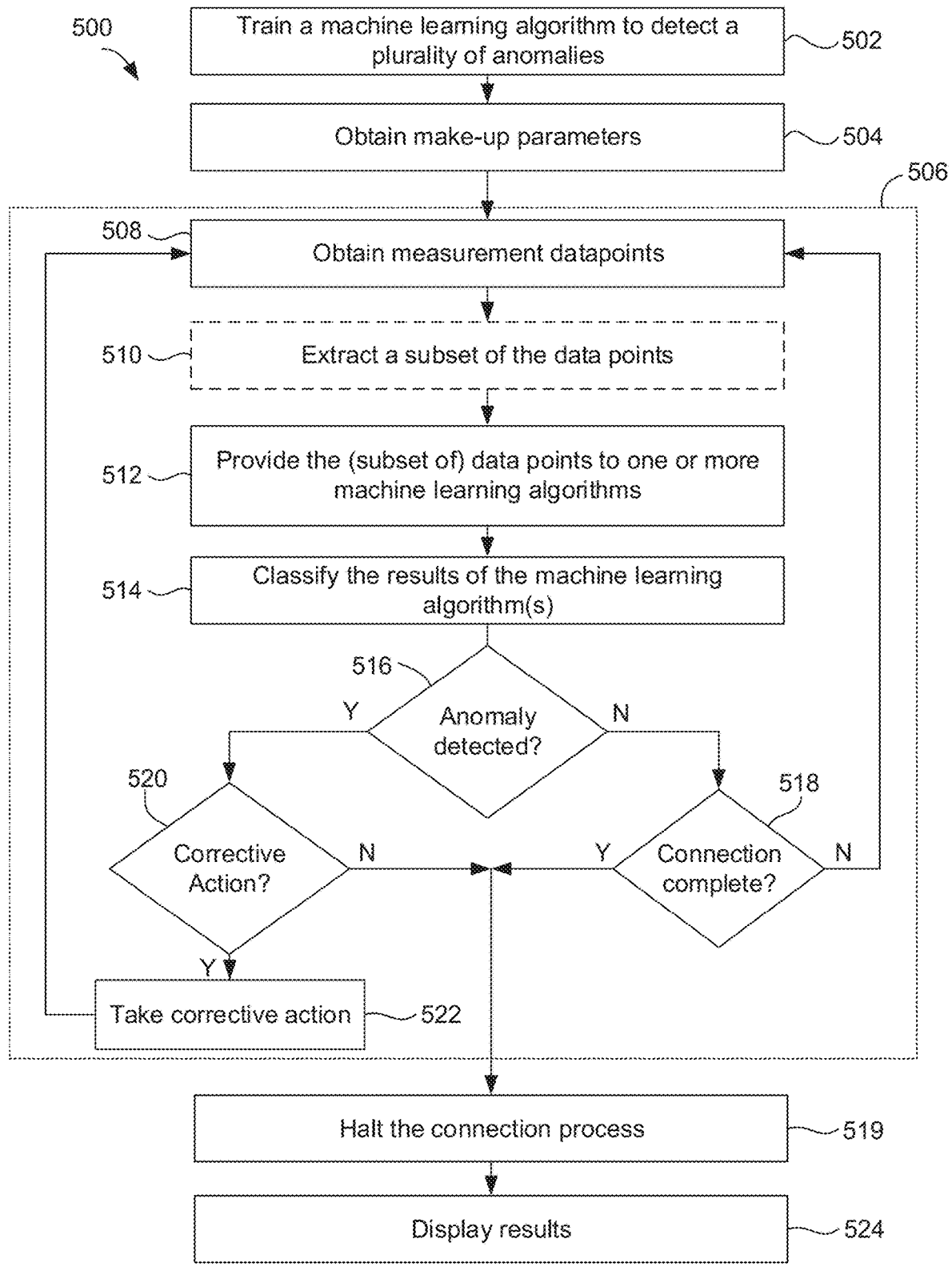
FIG. 5 illustrates another method for evaluating a connection in the connection process using machine learning, and, in some cases, adjusting the connection process to avoid rejected connections, according to an embodiment.

FIG. 5 illustrates another method 500 for evaluating a connection process, according to an embodiment. The method 500 may provide an embodiment of the evaluation at 112 of FIG. 1. Further, the method 500 may employ one or more machine learning algorithms, e.g., as discussed above for the method 400 of FIG. 4. However, the method 500 may include the ability to adjust the connection process, for example, to avoid an impending anomaly, based on the machine learning algorithm identification of data points and/or trends indicating such an impending anomaly.

The method 500 may begin by training a machine learning algorithm (or two or more such algorithms), as at 502, and as discussed above with respect to block 402. The method 500 may further include obtaining make-up parameters, which may provide various thresholds, and may generate rules therefrom that define when a connection is fully made up, for example, and may assist in distinguishing between an acceptable connection and one that should be rejected. The next stage, indicated by box 506, in the method 500 may occur contemporaneously with the connection process, such that the method 500 gathers and analyzes data at the same time the connection is being made. In particular, during the stage 506, the method 500 may include obtaining one or more measurement data points, as at 508. For example, the sensors 210, 212 and the controller 220 may support a particular sampling frequency, and/or such sampling frequency may be set in software or by a user. The sampling frequency is the rate at which new data points are acquired by the controller 220.

In some instances, the sampling frequency may be relatively high, and a large number of data points may be gathered. Rather than supplying all of the data points to the machine learning algorithm(s), the method 500 may include extracting a subset of these data points, as at 510. The data points may be extracted as discussed above, e.g., using a filter, or by providing a sliding window of a certain number of the most-recent data points. It will be appreciated that, as the stage 504 iterates through, the sliding window advances, but may provide overlapping sets of data points to the machine learning algorithm(s).

The method 500 may then include providing the (subset of) data points to the machine learning algorithm(s), as at 512. As mentioned above, two or more such algorithms may be used in some embodiments, one that establishes accept/reject, and one that identifies a particular anomaly among the rejections. The method 500 may receive a confidence/probability score (or "value") for the accept/reject/anomaly identification, and may classify the result, as at 514, and as discussed above.

The method 500 may further include determining whether an anomaly was detected, as at 516. If no anomaly is detected (determination at 516 is 'N'), the method 500 may proceed to determining whether to loop through the stage 504 again. This may include determining whether the connection process is complete, as at 518. This determination may be based on the make-up parameters, e.g., whether a certain delta torque or delta turn (or both), etc. value has been reached. If the connection process is not complete, the method 500 may proceed back to obtaining measurement data points at 506. If the connection process is complete, the method 500 may proceed to halting (ending, terminating, etc.) the connection process, as at 519.

Returning to the anomaly detection determination at 516, if the classification at 514 reveals an anomaly, the method 500 may include the controller 220 determining that an anomaly is detected (determination at 516 is 'Y'). In such case, the method 500 may proceed to determining whether the controller 220 can effectively avoid the anomaly or mitigate its impact by changing the operating parameters, for example, the speed or applied torque, of the tubular rotating equipment, as at 520. This determination may be made at least partially based on the type of anomaly detected by the machine learning algorithm. For example, a dope squeeze anomaly can be mitigated by slowing the rotational speed to allow for excess thread compound to settle prior to final makeup. Another such example would be the detection or prediction of a late shift anomaly where the controller 220 would reduce speed to eliminate spikes in the seal area of the connection.

If such a corrective action is available (determination at 520 is 'Y'), the controller 220 may predict the outcome of a corrective action, e.g., forecast an effect of the corrective action. For example, if the speed or torque is adjusted, the controller 220, e.g., using machine learning algorithms, may predict the outcome of the adjustment. If the predicted outcome is positive, e.g., the consequences of an anomaly are lessened and/or the anomaly is avoided, the method 500 may proceed to take such corrective action, e.g., by signaling to the tubular rotating equipment to adjust speeds, and the method 500 may loop back to obtaining measurements at 506 again, as the connection process continues. Otherwise, the controller 220 may halt the connection process, as at 519 before it is determined to be complete at 518, in order, e.g., to avoid spending time and risking the integrity of the tubulars by continuing a faulty connection process.

Before, during, or after halting the connection process at 519, the method 500 may include displaying the connection-related measurements and, where available, the results of the connection, as at 524. At this point, a user may also be able to input overrides to the machine learning algorithm's determination, e.g., the user may revert to previous operating parameters (override the corrective action), may accept a rejected connection, reject an accepted connection, or provide any other relevant input.

Figure 6:
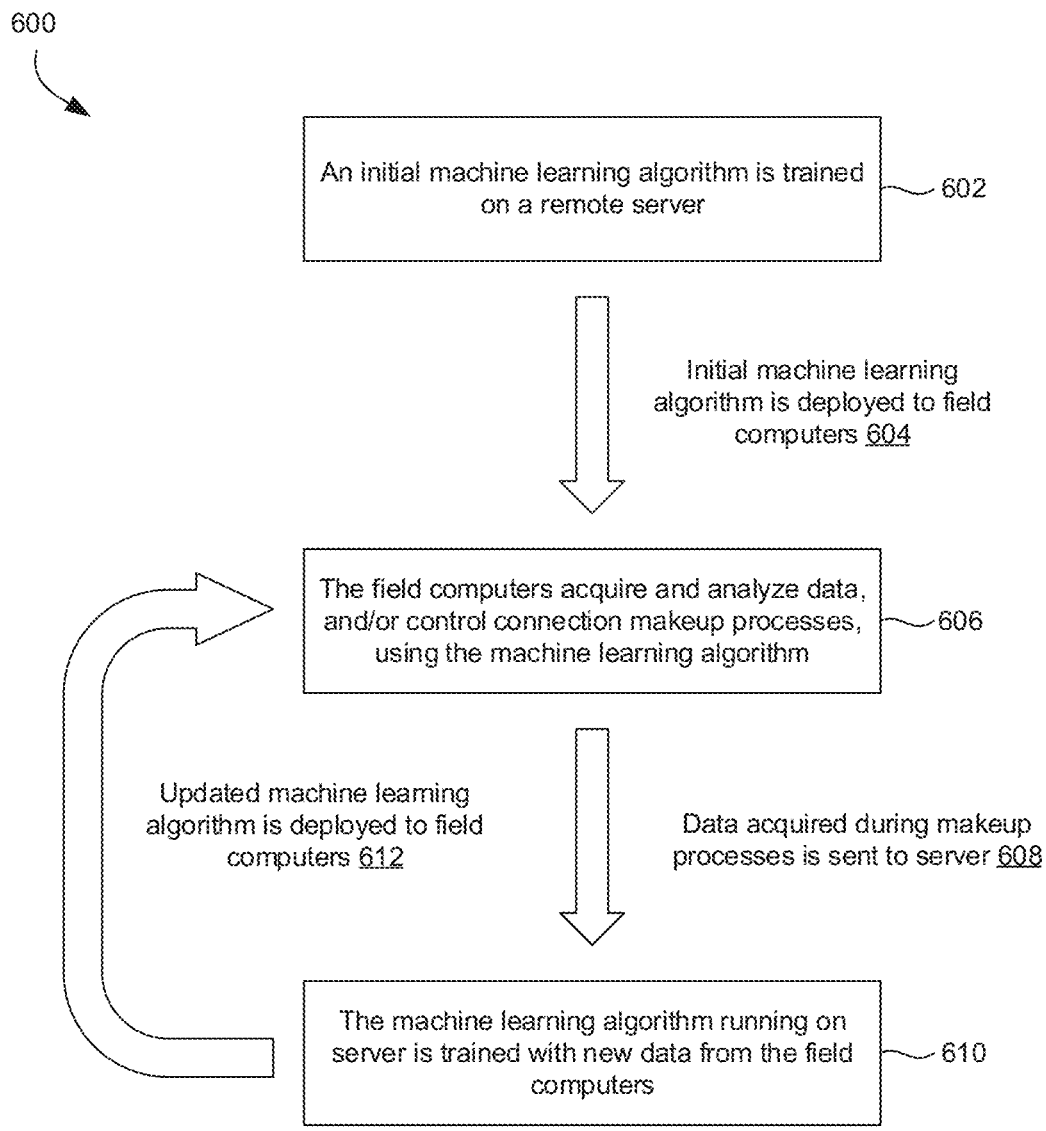
FIG. 6 illustrates a flowchart of a process for training, deploying, and using machine learning to acquire and analyze connection makeup data and/or control a connection makeup process, according to an embodiment.

FIG. 6 illustrates a flowchart of an intermittent training and deployment process 600 for the machine learning algorithms, according to an embodiment. The machine learning algorithms may be trained, as discussed above, using a corpus of historical data, as at 602. The machine learning algorithms may be trained on a remote (with respect to the field computers) server, e.g., as part of a cloud computing environment, whereby data is transmitted to a virtual machine executing on one or more servers, for example. Once trained, the initial machine learning algorithms may be deployed to the field computers, as at 604. Field computers may be considered those computers that are on or near a drilling rig, which may be used to control the operations of one or more components (rig hardware) thereof (e.g., the controller 220).

The field computers may acquire and analyze data acquired during connection makeup processes, and/or provide feedback control of the rig hardware during such processes, as at 606. As this occurs, the field computers may store the data and the associated analyses, controls, and/or other data, such as input from a human operator, in a local database.

The acquired data (and/or other information) may then be sent to the server, as at 608. This may occur continuously or at various intervals (daily, weekly, monthly, after a certain number of connections are made-up, etc.) according to bandwidth availability, connection speeds, etc.

The machine learning algorithms, still running on the server, may then be trained with the new data from the field computers, as at 610. The training may be supervised or unsupervised learning. The result of this further training may be a more accurate, updated model, in which certain connections may be strengthened, while others may be weakened, depending on the new data.

The updated machine learning algorithms may then be deployed back to the field computers, as at 612. This may take the form of a software update that is loaded into the field computers. Moreover, like the upload of data, this deployment may take place at various intervals (e.g., daily, weekly, monthly, quarterly, semi-annually, annually, after a certain number of additional connection makeup process data are analyzed, etc.). The process 600 may then loop back to using the machine learning algorithms in the field computers at 606, and continue to repeat the sequence of using, training, and redeploying the machine learning algorithms.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 7:
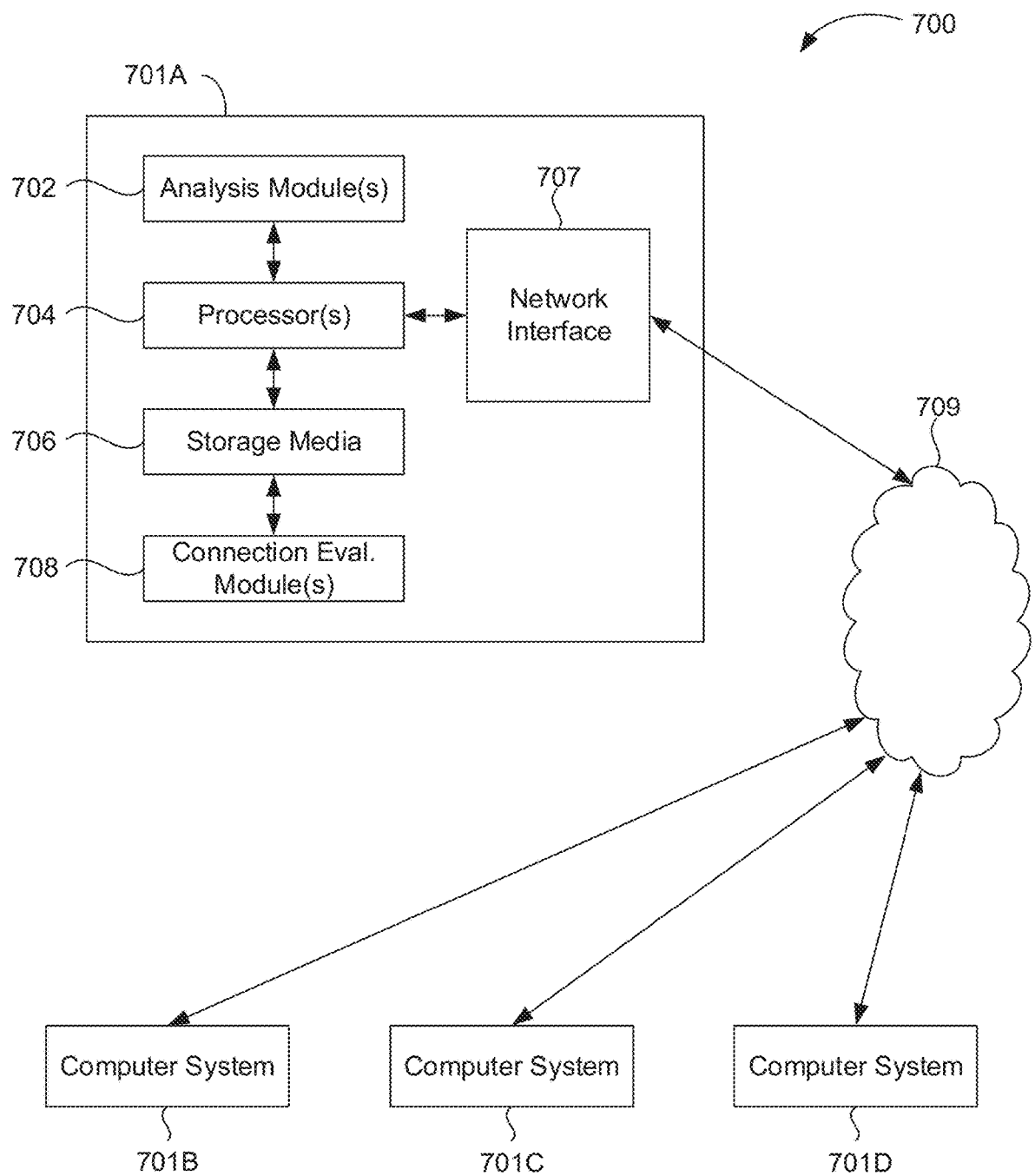
FIG. 7 illustrates a schematic view of a computer processor, according to an embodiment.

In some embodiments, any of the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis module(s) 702 configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor can include a microprocessor, microcontroller, processor module or subsystem, programmable integrated circuit, programmable gate array, programmable logic controller, or another control or computing device.

The storage media 706 can be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 700 contains one or more connection evaluation module(s). In the example of computing system 700, computer system 701A includes the connection evaluation module 708. In some embodiments, a single connection evaluation module may be used to perform some or all aspects of one or more embodiments of the methods. In alternate embodiments, a plurality of connection evaluation modules may be used to perform some or all aspects of methods.

It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function.

Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:
1. A method, comprising:
  acquiring measurements representing torque applied to a connection between a first tubular and a second tubular, a rotational position of the first tubular relative to the second tubular, or both;

obtaining a plurality of make-up parameters representing conditions under which the connection is fully made;

generating a plurality of rules for connection evaluation based on the make-up parameters;

automatically evaluating the connection using a computer, wherein automatically evaluating the connection comprises applying a plurality of static rules to determine connection acceptability, and applying a machine learning to optimize connection makeup or determine whether an anomaly has occurred while making the connection; and recommending accepting or rejecting the connection based on the automatic evaluation.

2. The method of claim 1, wherein the automatic evaluating occurs while the connection is being made, before the connection is complete.

3. The method of claim 1, wherein automatically evaluating further comprises determining a probability value of an acceptable connection or an unacceptable connection prior to the connection being formed.

4. The method of claim 1, wherein automatically evaluating comprises using the machine learning trained using a training corpus of connection torque-turn plots.

5. The method of claim 4, wherein automatically evaluating the connection comprises:
determining probabilities of a plurality of individual anomalies present in the dataset as an output of the machine learning; and
classifying the output of the machine learning to identify an anomaly present in the dataset.

6. The method of claim 4, further comprising:
acquiring the training corpus of datasets acquired during historical connection processes, wherein the datasets are each associated with at least one of acceptance, rejection, or a specific anomaly in the respective, associated historical connection processes; and
training the machine learning using the training corpus.

7. The method of claim 4, further comprising extracting a subset of the acquired measurements, wherein the dataset comprises the extracted subset and not a remainder of the measurements that were not extracted.

8. The method of claim 7, wherein extracting comprises applying a filter, a moving window, or a combination thereof to the measurements.

9. The method of claim 4, wherein the machine learning comprises a first machine learning configured to determine whether the dataset indicates a connection should be accepted or rejected, and a second machine learning configured to identify particular anomalies in the dataset.

10. The method of claim 4, wherein the automatic evaluating occurs while the connection is being made, and wherein the method further comprises indicating a detected anomaly based on the automatic evaluating prior to a completion of the connection.

11. The method of claim 4, wherein the automatic evaluating occurs while the connection is being made, the method further comprising:
determining an anomaly is present in the dataset before the connection is completed, or that an anomaly is likely in the future of the connection based on the dataset;
determining that a corrective action is available; and
adjusting an operating parameter of a tubular rotating component to avoid or mitigate a consequence of the determined anomaly or the anomaly that is likely in the future.

12. The method of claim 11, wherein adjusting the operating parameter comprises adjusting a speed or a torque of the tubular rotating component.

13. The method of claim 11, wherein determining that the corrective action is available comprises forecasting an effect of adjusting the operating parameter of the tubular rotating component using the machine learning.

14. The method of claim 1, wherein evaluating comprises identifying a particular anomaly based on the plurality of rules, and wherein the anomaly is selected from the group consisting of: Overtorque, Undertorque, High Shoulder, Low Shoulder, High Delta Turns, Low Delta Turns, High Delta Slope, Low Delta Slope, Dope Squeeze, Slippage, High Interference, Not Enough Turns, No Shoulder, Cross Threading, and Damaged Dump Valve.

15. The method of claim 1, wherein the make-up parameters include at least one parameter selected from the group consisting of: Make/Break mode, Shoulder Detect on/off, Makeup Type, Delta Torque, Delta Turns, Maximum Torque, Optimum Torque, Minimum Torque, Maximum Shoulder Torque, Minimum Shoulder Torque, Connection Delta Turn Minimum, Connection Delta Turn Maximum, Connection Delta Slope Minimum, Connection Delta Slope Maximum, Datapoints comprising Turns, Torque, RPM, and Time, Shoulder Point, and Double Bumped on/off.

16. A system, comprising:
a tubular rotating component configured to make a connection between a first tubular and a second tubular by rotating the first tubular, wherein the tubular rotating component comprises one or more sensors configured to measure torque applied to the first and/or second tubular, a rotational position of the first tubular relative to the second tubular, or both;
a controller in communication with the one or more sensors; and
one or more non-transitory, computer-readable media storing instructions thereon that, when executed by a processor of the controller, cause the controller to perform operations, the operations comprising:
acquiring, from the one or more sensors, measurements representing torque applied to a connection between the first tubular and the second tubular, a rotational position of the first tubular relative to the second tubular, or both;
obtaining a plurality of make-up parameters representing conditions under which the connection is fully made;
generating a plurality of rules for connection evaluation based on the make-up parameters;
automatically evaluating the connection, wherein automatically evaluating the connection comprises applying a plurality of static rules to determine connection acceptability, and applying a machine learning to optimize connection makeup or determine whether an anomaly has occurred while making the connection; and
recommending accepting or rejecting the connection based on the automatic evaluation.

17. The system of claim 16, wherein the automatic evaluating occurs while the connection is being made, before the connection is complete.

18. The system of claim 16, wherein automatically evaluating further comprises determining a probability value of an acceptable connection or an unacceptable connection.

19. The system of claim 16, wherein automatically evaluating comprises:

acquiring a training corpus of datasets acquired during historical connection processes, wherein the datasets are each associated with at least one of acceptance, rejection, or a specific anomaly in the respective, associated historical connection processes;

training the machine learning using the training corpus;

determining probabilities of a plurality of individual anomalies present in the dataset as an output of the machine learning; and classifying the output of the machine learning to identify an anomaly present in the dataset.

20. The system of claim 19, further comprising extracting a subset of the acquired measurements, wherein the dataset comprises the extracted subset and not a remainder of the measurements that were not extracted, wherein extracting comprises applying a filter, a moving window, or a combination thereof to the measurements.

21. The system of claim 19, wherein the machine learning comprises a first machine learning configured to determine whether the dataset indicates a connection should be accepted or rejected, and a second machine learning configured to identify particular anomalies in the dataset.

* * * * *